Patented Oct. 11, 1949

2,484,629

UNITED STATES PATENT OFFICE 2,484,629

2-SULFANILAMIDO - 4 - ALKOXYMETHYL -6- METHYL-PYRIMIDINES AND THEIR PREPARATION

William A. Lott, Maplewood, and William Braker, Newark, N. J., assignors to E. R. Squibb & Sons, New York, N. Y., a corporation of New York No Drawing. Application November 27, 1943, Serial No. 512,046

5 Claims. (Cl. 260—239.6)

This invention relates to, and has for its object the provision of: [A] compounds of the main general formula

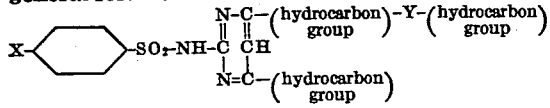

wherein X represents a member of the class consisting of amino and acyl-amino, and Y represents a member of the class consisting of O and S; [B] salts of these compounds; and [C] a method of preparing [A] and [B]. These compounds (and salts) are valuable chemotherapeutic agents.

The invention comprises especially compounds of the general formula

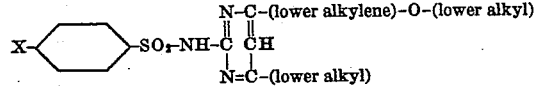

where X has the meaning given hereinbefore, and salts thereof. These compounds (and salts)—and notably those in which the 4- and 6-position pyrimidine substitutents are respectively —CH$_2$—O— (lower alkyl) and —CH$_3$—have advantageous properties, as will be pointed out hereinafter in connection with one of the examples.

The compounds of the main general formula may be prepared by condensing a compound of the general formula

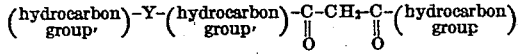

where Y has the meaning given hereinbefore—e. g. (methoxy-acetyl)-acetone—with guanidine (which term, as herein employed, comprehends also such guanidine-yielding salts as the carbonate), and condensing the resulting compound of the general formula

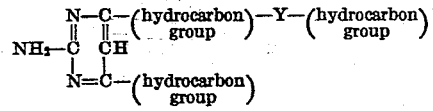

—e. g., 2-amino-4-methoxymethyl-6-methyl-pyrimidine—with a p-acylamino-benzene-sulfonyl halide; the free amino compound being obtained by saponification or hydrolysis of the resulting acylamino compound. Alternatively, the amino compounds of the main general formula may be prepared by condensing the compound of the general formula

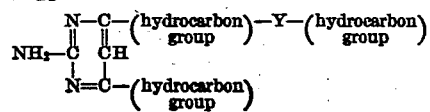

with a p-nitro-benzene sulfonyl halide, and reducing the resulting nitro compound to the corresponding amino compound; and if the corresponding acylamino compound is desired, it may be obtained by acylation (e. g., acetylation) in the conventional manner.

The compounds of the main general formula readily form salts with bases, for example, alkali-metal (including ammonium), alkaline-earth-metal, and organic-ammonium bases.

The reactants of the general formula

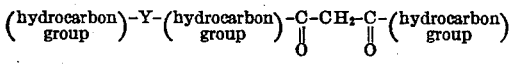

mentioned hereinbefore may conveniently be obtained by reacting a compound of the general formula (hydrocarbon group)-Y-(alkali metal)

Y having the meaning given hereinbefore, e. g., sodium methylate (in methanol), with a compound of the general formula (halogen)-(hydrocarbon group)-COOH e. g., chloracetic acid, converting the resulting acid of the general formula

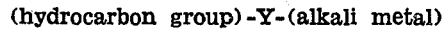

e. g., methoxy-acetic acid, into its lower alkyl ester—e. g., ethyl methoxy-acetate—and reacting this ester with a compound of the general formula

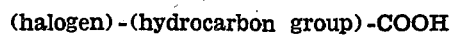

e. g., acetone.

Alternatively, the ester—e. g., ethyl methoxy-acetate—may be obtained by reacting a compound of the general formula

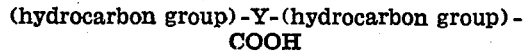

e. g., ethyl chloro-acetate, with a compound of the general formula (hydrocarbon group)-Y-(alkali metal)

e. g., sodium methylate (in methanol).

The following examples are illustrative of the invention:

EXAMPLE 1

*(a) Preparation of 2-amino-4-ethoxymethyl-6-methyl-pyrimidine*

7.5 g. (ethoxy-acetyl)-acetone [Ann. chim. phys. 9, 484 (1906)] and 5 g. guanidine carbonate are heated together on an oil bath at 130° C. for 3 hours. The reaction mixture is dissolved in benzene, treated with decolorizing charcoal, filtered, and diluted with a small quantity of hexane; and the resulting precipitate is washed and dried. The product melts at 105–106° C.

(b) *Preparation of 2-(N⁴-acetyl)-sulfanilamido-4-ethoxymethyl-6-methyl-pyrimidine*

19 g. 2-amino-4-ethoxymethyl-6-methyl-pyrimidine is dissolved in 60 cc. pyridine, and 30 g. acetyl-sulfanilyl chloride is added at 10° C. with stirring. After the reaction mixture has stood 16 hours, the pyridine is distilled off under reduced pressure, water is added to the residue and distilled off under reduced pressure, and the residue is recrystallized from 90° methanol. The product melts at 151° C.

(c) *Preparation of 2-sulfanilamido-4-ethoxymethyl-6-methyl-pyrimidine*

23 g. 2-(N⁴-acetyl) - sulfanilamido-4-ethoxymethyl-6-methyl-pyrimidine is dissolved in 65 cc. of a 10% aqueous solution of sodium hydroxide, and the resulting solution is refluxed for 1½ hours. The reaction mixture is then cooled, and acidified with acetic acid; the supernatant liquid is decanted; and the residue is recrystallized from alcohol. After two recrystallizations from alcohol, the product melts at 153–155° C.

(c) *Alternate*

23 g. 2-(N⁴-acetyl)-sulfanilamido - 4 - ethoxymethyl-6-methyl-pyrimidine is refluxed for 1½ hours with 230 cc. 10% hydrochloric acid and 250 cc. alcohol. The reaction mixture is then filtered, cooled, and neutralized with 10% sodium hydroxide solution; the resulting precipitate is filtered off, washed with water and dried; and the product is recrystallized from alcohol.

(d) *Preparation of the sodium salt of 2-sulfanilamido-4-ethoxymethyl-6-methyl-pyrimidine*

A solution of 32.2 g. 2-sulfanilamido-4-ethoxymethyl-6-methyl-pyrimidine in 250 cc. hot alcohol is added to a solution of 2.3 g. sodium in 50 cc. alcohol, and the resulting solution is distilled to dryness under reduced pressure. The residue (the sodium salt) is a white powder readily soluble in water.

(d) *Alternate*

32.2 g. 2 - sulfanilamido - 4 - ethoxymethyl-6-methyl-pyrimidine is dissolved in 57.5 cc. normal sodium hydroxide solution, and the resulting solution is distilled to dryness under reduced pressure. The residue (the sodium salt) is a white powder readily soluble in water.

EXAMPLE 2

(a) *Preparation of (methoxy-acetyl)-acetone*

A solution of 284 g. chloracetic acid in 300 cc. methanol is added to a solution of 138 g. sodium in 2 liters methanol, the addition being in such portions that the refluxing is maintained. The reaction mixture is then refluxed for 4 hours, the precipitated sodium chloride is filtered off, the filtrate is distilled to remove the methanol, and water is added and the distillation continued to remove the last traces of methanol. The residue is acidified by adding 330 g. concentrated hydrochloric acid, and the precipitated salt is filtered off and washed with ether; and the aqueous filtrate is extracted with three 400 cc. portions of ether. The (combined) ether extract is dried over magnesium sulfate and fractionally distilled whereby methoxy-acetic acid is obtained, boiling at 95–97° C. at 13 mm.

496 g. methoxy-acetic acid is dissolved in a mixture of 1 liter absolute ethanol and 45 cc. concentrated sulfuric acid; and after standing 24 hours, the reaction mixture is poured onto ice, and extracted 3 times with ether. The (combined) ether extract is dried over magnesium sulfate, and the ether is removed by distillation; and the residue, distilled at atmospheric pressure, yields 192 g. ethyl methoxy-acetate, boiling at 142–8° C.

6.85 sodium is made into sodium shot under toluene, the supernatant toluene is removed, 100 cc. dry benzene is added, the mixture is cooled to 0° C., and 44 g. ethyl methoxy-acetate is added with stirring. Then, while maintaining the mixture at −5 to 0° C., 19 g. acetone is added over a period of an hour; and the reaction mixture is continuously stirred for 5 hours while cooling with an ice-water bath, and then placed in a refrigerator for 18 hours. The separated sodium salt of (methoxy-acetyl)-acetone is filtered off and washed with benzene; and a further quantity of the salt is obtained by concentrating the mother liquor and diluting the resultant concentrated solution with ether. The (combined) salt is added in increments to a mixture of 12 cc. acetic acid and 120 cc. water; the resultant solution is extracted 4 times with ether; the (combined) ether extract is dried over anhydrous sodium sulfate; the ether solution is filtered; and the filtrate is distilled. The residue (19 g.) is (methoxy-acetyl)-acetone.

(b) *Preparation of 2-amino-4-methoxymethyl-6-methyl-pyrimidine*

19 g. (methoxy-acetyl)-acetone and 26.5 g. guanidine carbonate are refluxed together on a steam bath for 2 hours; and the reaction product is dissolved in a mixture of 25 cc. concentrated hydrochloric acid and 10 cc. water. The solution is neutralized with ammonium hydroxide; and the resulting precipitate is filtered off, washed with water, and dried. The product, obtained in a yield of 16 g., melts at 114–116° C.

(c) *Preparation of 2-(N⁴-acetyl)-sulfanilamido-4-methoxymethyl-6-methyl-pyrimidine*

61 g. 2-amino-4-methoxy-6-methyl-pyrimidine is dissolved in 260 cc. pyridine, and cooled to 5–10° C.; and 91 g. acetyl-sulfanilyl chloride is added thereto with stirring over a period of a half hour, while maintaining the temperature at 5–10° C. After the reaction mixture has stood 12–16 hours, the pyridine is removed therefrom by distillation under reduced pressure, and the residue is treated with 200 cc. water. The resulting insoluble material is filtered off, washed with water, and dried, yielding 91 g. of the product, melting at 188–90° C. After recrystallization from alcohol, the product melts at 193–5° C.

(d) *Preparation of 2-sulfanilamido-4-methoxymethyl-6-methyl-pyrimidine*

91 g. 2-(N⁴-acetyl)-sulfanilamido-4-methoxymethyl-6-methyl-pyrimidine is dissolved in 260 cc. of a 10% aqueous solution of sodium hydroxide, and the solution is refluxed for 3 hours, and then neutralized with acetic acid. The resulting precipitate is removed by filtration, washed with water, and dried, yielding 72 g. of the product. After recrystallization from alcohol, the product melts at 169–170° C.

2 - sulfanilamido - 4 - methoxymethyl - 6-methyl-pyrimidine is comparable to sulfadiazine in its chemotherapeutic action, toxicity, and absorption; and in addition, it is an effective antimalarial. Its acetyl derivative—i. e., 2-(N⁴-acetyl) - sulfanilamido - 4 - methoxymethyl - 6 - methyl pyrimidine—possesses the unique and advantageous property of being very soluble.

(e) *Preparation of the sodium salt of 2-sulfanilamido-4-methoxymethyl-6-methyl-pyrimidine*

30.8 g. 2-sulfanilamido-4-methoxymethyl-6-methyl-pyrimidine is dissolved in 550 cc. hot alcohol, and the solution is added to a solution of 2.3 g. sodium in 50 cc. alcohol; and the resulting solution is distilled to dryness under reduced pressure. The residue (the sodium salt) is a white powder readily soluble in water.

(e) *Alternate*

30.8 g. 2-sulfanilamido-4-methoxymethyl-6-methyl-pyrimidine is dissolved in 57.5 cc. normal sodium hydroxide solution, and the resulting solution is distilled to dryness under reduced pressure. The residue (the sodium salt) is a white powder readily soluble in water.

EXAMPLE 3

(a) *Preparation of (ethylmercapto-acetyl)-acetone*

11.5 g. sodium shot is suspended in 125 cc. benzene, and 81.4 g. ethyl mercapto-acetate is added thereto at 5° C. with stirring. Then 29.6 dry acetone is added gradually over a period of 2 hours, while stirring, the reaction mixture is kept in the ice box for about 18 hours, and dilute acetic acid is added. The aqueous layer formed is extracted with benzene, the extract is combined with the benzene layer, and the benzene is removed by distillation; and the residual oil is fractionated to purify the product.

(b) *Preparation of 2-amino-4-(ethylmercaptomethyl)-6-methyl-pyrimidine*

16 g. (ethylmercapto-acetyl)-acetone and 11.1 g. guanidine carbonate are heated together on an oil bath at 130° C. for 3 hours, and the reaction mixture is dissolved in a mixture of 50 cc. concentrated hydrochloric acid and 25 cc. water. The resulting solution is neutralized with ammonium hydroxide; and the precipitated product is filtered off, washed with water, and dried.

(c) *Preparation of 2-(N⁴-acetyl-sulfanilamido)-4 - (ethylmercapto - methyl) -6-methyl-pyrimidine*

18.3 g. 2-amino-4-(ethylmercapto-methyl)-6-methyl-pyrimidine is dissolved in 55 cc. pyridine, the solution is cooled to 10° C., and 23.4 g. acetylsulfanilyl chloride is added with stirring over a period of a half-hour, while maintaining the temperature at 10° C. After the reaction mixture has stood 12–16 hours, the pyridine is distilled off under reduced pressure, and water is twice added to the residue and each time distilled off under reduced pressure. The residue is then treated with 100 cc. water; the insoluble material is filtered off, washed with water, and dried; and the product is recrystalled from alcohol.

(d) *Preparation of 2-sulfanilamido-4-(ethylmercapto-methyl-6-methyl-pyrimidine*

38 g. 2-(N⁴-acetyl-sulfanilamido)-4-(ethylcapto-methyl)-6-methyl-pyrimidine is dissolved in 100 cc. of a 10% aqueous solution of sodium hydroxide, and the solution is refluxed for 1½ hours, cooled, and neutralized with acetic acid. The resulting precipitate is filtered, washed with water, and dried; and the product is recrystallized from the alcohol.

EXAMPLE 4

(a) *Preparation of 2-(p-nitro-benzene-sulfonamido)-4-ethoxymethyl-6-methyl-pyrimidine*

33.4 g. 2 - amino-4-ethoxymethyl-6-methyl-pyrimidine (Example 1a) is dissolved in 100 cc. pyridine, and the solution is cooled to 5–10° C.; and 46.5 g. p-nitro-benzene-sulfonyl chloride is added with stirring over a period of 20 minutes, while maintaining the temperature at 5–10° C. After the reaction mixture has stood 12–16 hours, the pyridine is removed therefrom by distillation under reduced pressure; and 100 cc. water is added to the residue and distilled off, and this treatment is repeated to remove the remaining pyridine. Then 150 cc. water is added to the residue; and the insoluble product is filtered off, washed with water, and dried.

(b) *Preparation of 2-sulfanilamido-4-ethoxymethyl-6-methyl-pyrimidine*

10 g. 2 - (p - nitro-benzene-sulfonamido)-4-ethoxymethyl-6-methyl-pyrimidine and 10 g. powdered iron are thoroughly mixed together in a mortar, and the mixture is added to 40 cc. acetic acid which has been heated to about 70° C., the acetic acid being agitated during the addition, and the addition being in small portions and at such rate that mild ebullition continues throughout the reaction. The reaction mixture is then cooled, water is added, and the liquid portion removed from the solid portion by centrifugation. 300 cc. 10% sodium hydroxide solution is added to the solid portion, and the mixture is stirred thoroughly and centrifuged; and the separated solid portion is again extracted with a 10% sodium hydroxide solution and centrifuged. The (combined) supernatant is filtered, and made just neutral to litmus paper; and the precipitated product is recrystallized from alcohol.

(b) *Alternate*

10 g. 2 - (p - nitro-benzene-sulfonamido)-4-ethoxymethyl-6-methyl-pyrimidine is dissolved in 200 cc. alcohol, 1 g. 5% palladized carbon is added, and the mixture is shaken with hydrogen at atmospheric pressure until reduction is complete. The catalyst is filtered off; the filtrate is distilled to dryness under reduced pressure; and the residue (the product) is recrystallized from alcohol.

Manifestly, a large number and variety of other compounds of the main general formula may be prepared by using the appropriate reactants in the procedure of the foregoing examples, the following being further examples of compounds embraced by the invention (in the preparation of which the corresponding p-nitro-benzene-sulfonamido or acetyl-sulfanilamido compounds woulde be produced, and which compounds may of course be converted into their salts with bases, especially into the corresponding sodium salts):

Example 5.—2 - sulfanilamido-4-(α-methoxyethyl)-6-methyl-pyrimidine; obtained by using α-chlorpropionic acid instead of chloracetic acid in the procedure of Example 2.

Example 6.—2 - sulfanilamido - 4 - (phenoxymethyl)-6-methyl-pyrimidine, obtained by using phenol in place of methanol in the procedure of Example 2.

Example 7.—2-sulfanilamido-4-methoxymethyl-6-ethyl-pyrimidine; obtained by using 2-butanone instead of acetone in the procedure of Example 2.

*Example 8.*—2-sulfanilamido-4-methoxymethyl-6-phenyl-pyrimidine; obtained by using acetophenone instead of acetone in the procedure of Example 2.

*Example 9.*—2 - sulfanilamido - 4 - benzyloxymethyl-6-methyl-pyrimidine; obtained by using benzyl alcohol instead of methanol in the procedure of Example 2.

*Example 10.*—2-sulfanilamido-4-(β-ethoxyethyl)-6-methyl-pyrimidine; obtained by using β-chlorpropionic instead of chloracetic acid in the procedure of Example 2.

*Example 11.*—2 - sulfanilamido - 4 - (gamma-methoxypropyl)-6-methyl-pyrimidine; obtained by using gamma-chlorbutyric acid instead of chloracetic acid in the procedure of Example 2.

*Example 12.*—2-sulfanilamido-4-(4'-methoxybenzyl)-6-methyl-pyrimidine; obtained by using p-methoxy-phenyl-acetic acid instead of methoxy-acetic acid in the procedure of Example 2.

*Example 13.*—2 - sulfanilamido-4-(α-methoxybenzyl)-6-methyl-pyrimidine; obtained by using α-chloro-α-phenyl-acetic acid instead of chloracetic acid in the procedure of Example 2.

The (methoxyacetyl)-acetone reactant, whose preparation is described in Example 2, may also be obtained by reacting ethyl acetate with 1-methoxy-2-propanone (in the same manner as described for the reaction of ethyl methoxyacetate and acetone); and other reactants of the general formula

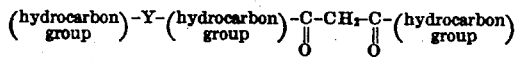

wherein Y has the meaning given hereinbefore, may be obtained by this alternative process, i. e., by interacting the appropriate compound of the general formula

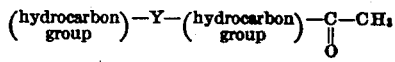

with the appropriate compound of the general formula

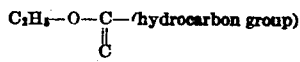

Although the acylamino compounds of this invention have been illustrated by acetylamino compounds, and the salts have been illustrated by the sodium salts, it is manifest that other acylamino compounds of the main general formula, e. g., propionyl-amino compounds, and other salts of amino compounds of the main general formula, e. g., calcium salts, may be obtained by using the corresponding reactants in the procedure of the foregoing examples.

While the pyrimidine nucleus of the compounds of this invention has been illustrated as having the following structure

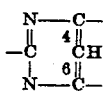

the compounds may actually have the isomeric or tautomeric structure

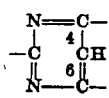

and it is intended that the structural formulas illustrated cover the compounds of this invention whether or not they have this isomeric or tautomeric structure.

The invention may be variously otherwise embodied, within the scope of the appended claims.

We claim:

1. A compound of the group consisting of: compounds of the general formula

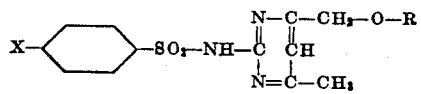

wherein R represents a member of the group consisting of methyl and ethyl, and X represents a member of the class consisting of amino and acylamino; and salts of these compounds.

2. 2-sulfanilamido-4-ethoxymethyl-6 - methyl-pyrimidine.

3. 2-($N^4$ - acetyl)-sulfanilamido - 4 - methoxymethyl-6-methyl-pyrimidine.

4. 2 - sulfanilamido-4-methoxymethyl-6-methyl-pyrimidine.

5. The method which comprises condensing a compound of the general formula

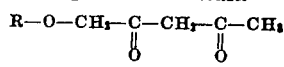

wherein R represents a member of the group consisting of methyl and ethyl, with guanidine, condensing the resulting compound with a p-acylamino-benzene-sulfonyl halide, and converting the resulting acylamino compound into the corresponding amine.

WILLIAM A. LOTT.
WILLIAM BRAKER.

REFERENCES CITED

The following references are of record in the file of this patent:

UNITED STATES PATENTS

| Number | Name | Date |
|---|---|---|
| 2,166,233 | Buchman | July 18, 1939 |
| 2,170,885 | Chitwood | Aug. 29, 1939 |
| 2,192,828 | Daniels | Mar. 5, 1940 |
| 2,351,333 | Gysin | June 13, 1944 |
| 2,435,002 | Hartmann et al. | Jan. 27, 1948 |

FOREIGN PATENTS

| Number | Country | Date |
|---|---|---|
| 114,821 | Australia | May 21, 1942 |

OTHER REFERENCES

Journal Amer. Chem. Soc., Aug. 1940, pp. 2002–2005.

Journal Amer. Chem. Soc., Aug. 1941, pp. 2188–2189.

Journal Amer. Chem. Soc., Nov. 1941, pp. 3028–3030.

Journal Amer. Chem. Soc., Oct. 1942, pp. 2340–2342.

Wiselogle, "Survey of Antimalarial Drugs, 1941–1945" (Edwards; Ann Arbor, Mich., 1946), vol. II, pp. 2, 3, and 1418, vol. I, pp. 472–473, 498–499.

Certificate of Correction

Patent No. 2,484,629                                      October 11, 1949

WILLIAM A. LOTT ET AL.

It is hereby certified that error appears in the printed specification of the above numbered patent requiring correction as follows:

Column 7, lines 63 to 66 inclusive, for the formula reading

and that the said Letters Patent should be read with this correction therein that the same may conform to the record of the case in the Patent Office.

Signed and sealed this 7th day of February, A. D. 1950.

[SEAL]

THOMAS F. MURPHY,
*Assistant Commissioner of Patents.*